United States Patent [19]

Wilkins

[11] Patent Number: 5,317,137
[45] Date of Patent: May 31, 1994

[54] MAGNETIC DEBIT CARD READER FRAUDULENT USE PREVENTION

[75] Inventor: John L. Wilkins, Manassas Park, Va.

[73] Assignee: Comproducts Inc., Manassas Park, Va.

[21] Appl. No.: 839,567

[22] Filed: Feb. 24, 1992

[51] Int. Cl.⁵ .......................... G06K 7/08; G06K 5/00
[52] U.S. Cl. ...................................... 235/380; 235/449
[58] Field of Search ............................... 235/380, 449

[56] References Cited

U.S. PATENT DOCUMENTS

| | | | |
|---|---|---|---|
| 3,818,187 | 6/1974 | Lovendusky et al. | 235/380 |
| 4,322,613 | 3/1982 | Oldenkamp | 235/449 |
| 4,711,993 | 12/1987 | Kosednar et al. | 235/380 |
| 4,929,821 | 5/1990 | Kocznar et al. | 235/493 |

FOREIGN PATENT DOCUMENTS

| | | | |
|---|---|---|---|
| 3309890 | 9/1984 | Fed. Rep. of Germany | 235/380 |
| 3313356 | 10/1984 | Fed. Rep. of Germany | 235/380 |
| 116087 | 6/1985 | Japan | 235/449 |

*Primary Examiner*—John Shepperd
*Attorney, Agent, or Firm*—Nixon & Vanderhye

[57] ABSTRACT

Fraud in the utilization of debit cards having magnetic media on one face, in debit card readers having magnetic read/write heads, is prevented. With the magnetic head the card is automatically read when inserted into the debit card reader to determine information from the magnetic media. The card can be invalidated immediately after the data is read, and only revalidated if it is determined the same card resides in the reader throughout the transaction. Generally simultaneously with reading, a security code is written on the magnetic media with the magnetic head, and/or after the card has come to rest in a transaction position, at least one of a plurality of card position sensors is enabled to sense the movement of the card from its rest position. Then prior to completing a transaction the magnetic media is read to be sure that the security code is present, and/or it is determined from the sensors if the card has moved more than a predetermined amount from its rest position. If either aberrant condition is determined, the read/write head is used to invalidate the card (or prevent revalidation of the card) and displays a fraud code on the reader LCD. Also a gate is provided at the entrance to the reader, and alternatively or as a compliment to the other steps and apparatus, the gate can be controlled to positively prevent movement of the card out of the entrance to the reader until the transaction is completed, or to trap the card if it is an invalid one.

14 Claims, 2 Drawing Sheets

MAGNETIC DEBIT CARD READER FRAUDULENT USE PREVENTION

BACKGROUND AND SUMMARY OF THE INVENTION

The use of magnetic debit cards is gaining widespread acceptance as a perfect system for automated point of sale control, as well as photo identification, master accounting, and access control functions. For example the Versacard TM system marketed by Digital Access Control of Manassas Park, Va. provides for the utilization of plastic cards with magnetic media on a face thereof in debit card readers which control photocopiers of all kinds, printers and other computer operated devices, facsimile machines, microfiche equipment, or any other business machines, laundry machines, vending machines and service dispensers, parking gates, and any other conventionally coin operated devices, as well as being usable in identification readers for access control, and identification (e.g. photo ID purposes).

While debit card systems, and associated readers, have enormous advantages compared to coin controlled and like equipment, there are some systems and card readers that are on the market which have an enormous potential for fraudulent utilization. Typically during utilization of the debit card system, a debit card with magnetic media on one face thereof is inserted into a debit card reader so that the magnetic media is inserted with proper orientation into a debit card reader so that the magnetic media thereon is read with a magnetic read/write head. In some systems on the market today, after the card is read and the information about the amount of "money" or "credit" remaining on the card is transmitted to a memory of a CPU, the transactions are allowed, and at the end of the transactions a new amount of "money" or "credit" remaining on the card is rewritten on the card with the magnetic read/write head.

This system is open to gross abuse. For example if one takes a debit card with $99.00 "money" on it, and attaches tape or other withdrawal media to one end of it, and then inserts it into a debit card reader with a like debit card—only with only a few cents remaining—on top of it, waits until the magnetic read/write head has read the amount of money remaining on the card and fed that to the CPU so that the computer assumes control over the transaction, and then quickly jerks out the lower card (the upper card remaining), at the end of the transaction the remaining card will be rewritten with whatever amount remains after the transaction is completed utilizing the amount of money that was originally on the first, lower card. For example if the lower card had $99.00 left, the upper card one cent, and the transaction uses one dollar, $98.00 will be written onto the card that previously had only one cent left, causing a loss to the business utilizing the system of $97.99. This same fraud can be practiced by inserting a valuable card, and then—after reading—inserting a worthless card between the valuable card and the read/write head.

According to the present invention, the fraudulent manipulation of debit card readers as described above, utilizing a worthless and a valuable debit card pair by changing the worthless card for the valuable card, is avoided in a number of alternative or complimentary manners.

According to a first aspect of the present invention, a method of preventing fraud in the utilization in a transaction of debit cards having magnetic media on a face thereof and debit card readers having a magnetic read/write head is provided. The method comprises the steps of automatically: (a) With the magnetic head, reading a card inserted into a debit card reader to determine information from the magnetic media thereon. (b) Generally simultaneously with step (a), writing a security code on the magnetic media with the magnetic head. (c) Prior to completing a transaction with the card, reading the magnetic media to be sure that the security code is present. And, (d) insuring that the card cannot be used for further transactions if in response to step (c) it is determined that the security code is not present (e.g. by invalidating the card in the reader with the read/write head, or if the card was invalidated immediately after step (a), precluding revaluation of the card).

As used in the present specification and claims, "invalidating" means to render the card incapable of being properly utilized in a magnetic read, either by placing magnetic indicia on the card that precludes normal transactions from taking place, or by erasing or disarranging data in the magnetic strips.

According to another aspect of the present invention, a different method is provided for preventing fraud, which may be utilized alone, or preferably in conjunction with the method as described above. According to the second aspect of the present invention the debit card reader has a gate at an entrance to the reader, and the method comprises the steps of automatically: (a) With the magnetic head, reading a card inserted into a debit card reader to determine information from the magnetic media thereon. (b) Generally simultaneously with step (a), closing the gate to positively prevent movement of the card out of the entrance to the reader until the transaction is completed. And, (c) after completion of a transaction, opening the gate to provide for removal of the card from the reader, or if it is determined that the card is illegal, the card can be trapped in the reader.

According to another aspect of the present invention, an alternative or complimentary method of preventing fraud is provided utilizing a debit card reader having a plurality of card position sensors. According to this alternative or complimentary method of the invention, the following steps are practiced automatically: (a) With the magnetic head, reading a card inserted into a debit card reader to determine information from the magnetic media thereon. (b) Generally simultaneously with step (a), after the card has come to rest in a transaction position, enabling at least one of the sensors to sense the movement of the card from its rest position. And, (c) if in response to step (b) it is determined that the card has moved more than a predetermined amount from its rest position prior to completion of a transaction, invalidating the card in the reader with the read/write head, or precluding revaluation if the card was invalidated immediately after step (a).

In general, according to the invention there may be provided a method of preventing fraud in the utilization in a transaction with magnetic debit cards having magnetic media on a face thereof and debit card readers having a magnetic read/write head, by practicing the steps of automatically: (a) With the magnetic head, reading a card inserted into a debit card reader to determine information from the magnetic media thereon. (b) Invalidating the card with the read/write head. (c) Prior to completing a transaction with the card, checking card parameters or position to determine whether or not the card present is the same card read in step (a). (d) If in response to step (c) it is determined that the original card is not present, insuring that the card cannot be used for further transactions by not revalidating the card; and (e) if it is determined during step (c) that the card is the card originally read in (a), revalidating the card with the proper enabled amount on it.

The invention also contemplates apparatus for implementation of each of the methods described above.

The invention is particularly advantageous and desirable since it can be practiced merely by changing software controls for equipment pre-existing in conventional debit card readers. In some circumstances, however, where a gate is not present, or where a gate at the entrance has insufficient structural integrity, a gate, or a more substantial gate, controlled by a gate motor, is provided at the entrance to the debit card reader. However because the invention primarily relates to a method of control of already existing parts, it is extremely easy to retrofit onto existing units.

In practicing the method according to the invention, if it is determined that the security code is not present, and/or that a card has moved more than a predetermined amount from its rest position prior to completion of a transaction, in addition to invalidating the card, a "fraud" message can be displayed on the LCD associated with the reader. Also, in order to provide data to assist in the capture of those attempting fraudulent use of the system, date, location, and like information can be magnetically encoded onto the card so that if the card is ever presented for redemption the true circumstances of the fraudulent use can be identified.

It is the primary object of the present invention to prevent fraud in the utilization in a transaction of debit cards having magnetic media on a face thereof in debit card readers. This and other objects of the invention will become clear from an inspection of the detailed description of the invention, and from the appended claims.

DETAILED DESCRIPTION OF THE DRAWINGS

Figure 1:
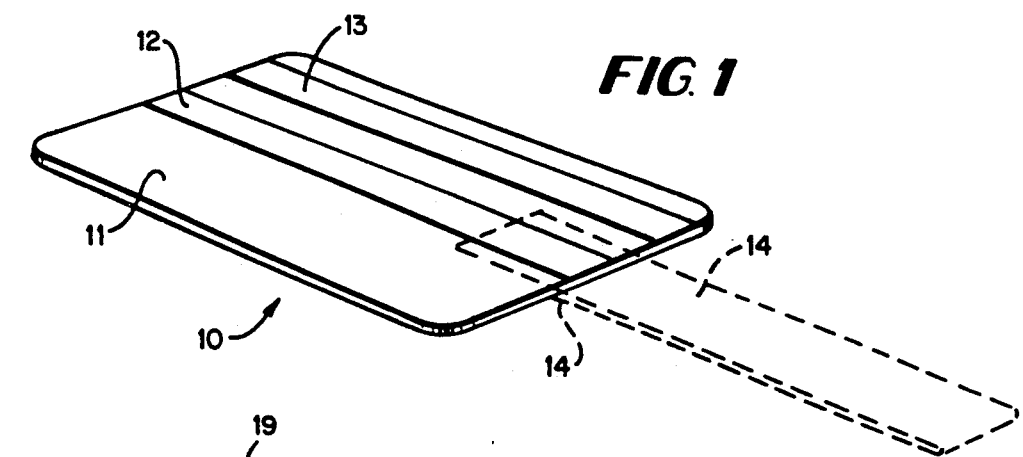
FIG. 1 is a perspective view of an exemplary debit card utilizable according to the present invention, showing tape—in dotted line—attached thereto for fraudulent utilization of the debit card.

FIG. 1 illustrates a conventional debit card 10, such as a "Versacard TM" marketed by Digital Access Control of Manassas Park, Va., or a "Valuecard" marketed by Verifone. The card 10 includes a face 11 on which magnetic media is provided, e.g. in the form of one or more strips 12, 13. The card 10 can potentially be used in a fraudulent manner in some debit card readers by attaching strips of adhesive tape 14 to opposite faces of the card 10, and then placing another, almost valueless card 10' on top of the card 10, or by inserting a worthless card between a valuable card and the magnetic head once the valuable card has been read.

Figure 2:
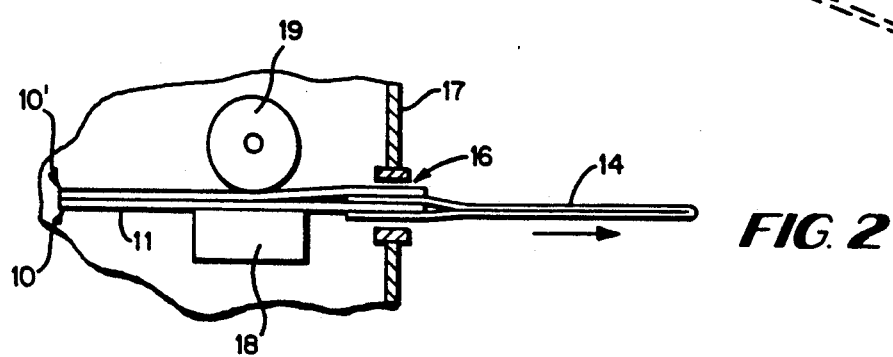
FIG. 2 is a side schematic view, partly in cross-section and partly in elevation, showing a method of attempting fraudulent utilization of debit cards in a conventional debit card reader.

An exemplary attempt at fraudulent utilization is illustrated with regard to FIG. 2, in which an entrance 16 is provided to a debit card reader 17, having a magnetic read/write head 18, with one or more drive wheels 19 for moving the card 10 into the proper position within the reader 17. In the fraudulent utilization of the cards 10/10', once the cards 10/10' have been fed together into the reader 17 (with the surface 11 of each at the bottom) in exact juxtaposition, as soon as the head 18 (whether it moves, or whether the cards are moved back and forth within the reader 17) has read the value of the card 10, the thief quickly jerks on the adhesive tape 14, removing the card 10 from the reader 17, but the card 10' remaining in place. In most debit card readers that are capable of being fraudulently manipulated as described herein, it is easy to determine from the sounds and other indicia associated with the reader 17 when the reading has been completed. At the end of the transaction, the read/write head 18 takes from memory in the CPU (deducting the amount of any goods or services purchased during the transaction) the amount of money that was associated with the card 10, and writes that information on the magnetic strip 12 or 13 of the card 10'. Thus the value of the card 10 has not been diminished at all, while the value of the card 10' has been enhanced, or has been utilized to purchase goods or services equal to the amount of value originally provided on the card 10.

Figure 3:
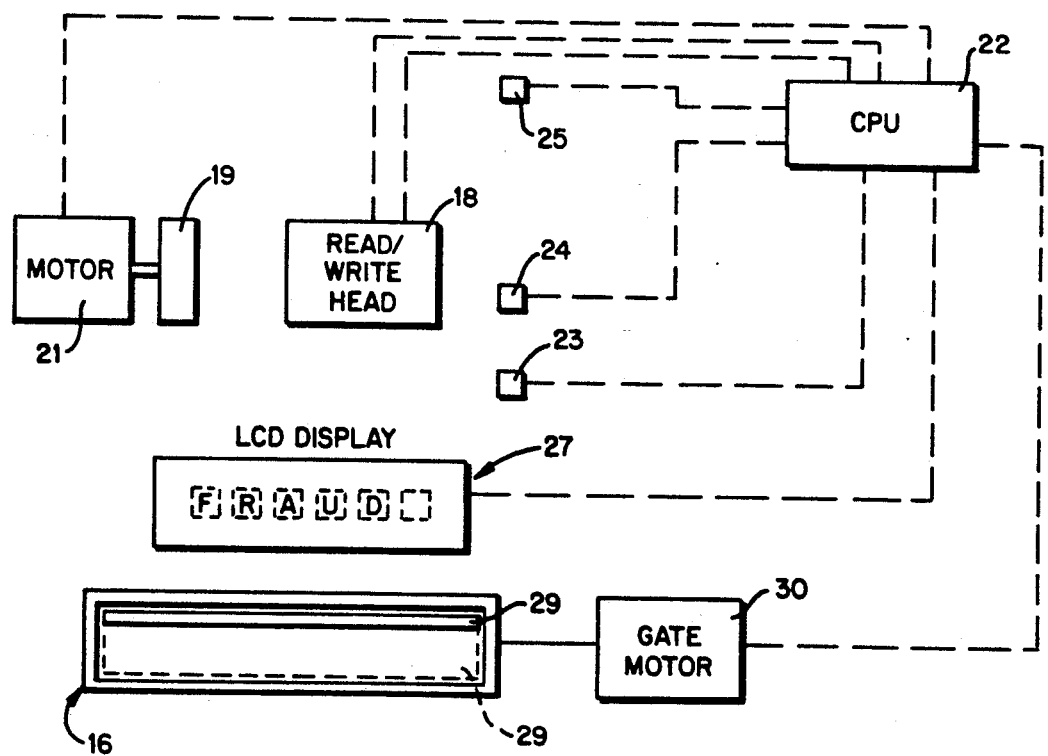
FIG. 3 is a control schematic illustrating various components utilizable according to the present invention in order to prevent fraud in the utilization of debit cards.

The various apparatus components of the card reader 17 of FIG. 2 are illustrated in FIG. 3 showing schematic interconnections between them. According to the invention, it is not necessary to change any of the components (except for possibly the gate configuration, or adding sensors if the reader does not normally have them), but rather merely the components are controlled in such a way that the fraudulent transaction described above with respect to FIGS. 1 and 2 cannot take place.

The apparatus of FIG. 3 includes a motor 21 for driving one or more drive wheels 19 for powering the debit card 10 movement, a CPU 22, a plurality of card position sensors 23 through 25, an LCD 27, and a gate 29 associated with the card reader entrance 16, the gate 29 optionally powered by a gate motor 30. All of the components illustrated in FIG. 3 are powered by and/or communicate with the CPU 22.

Figure 4:
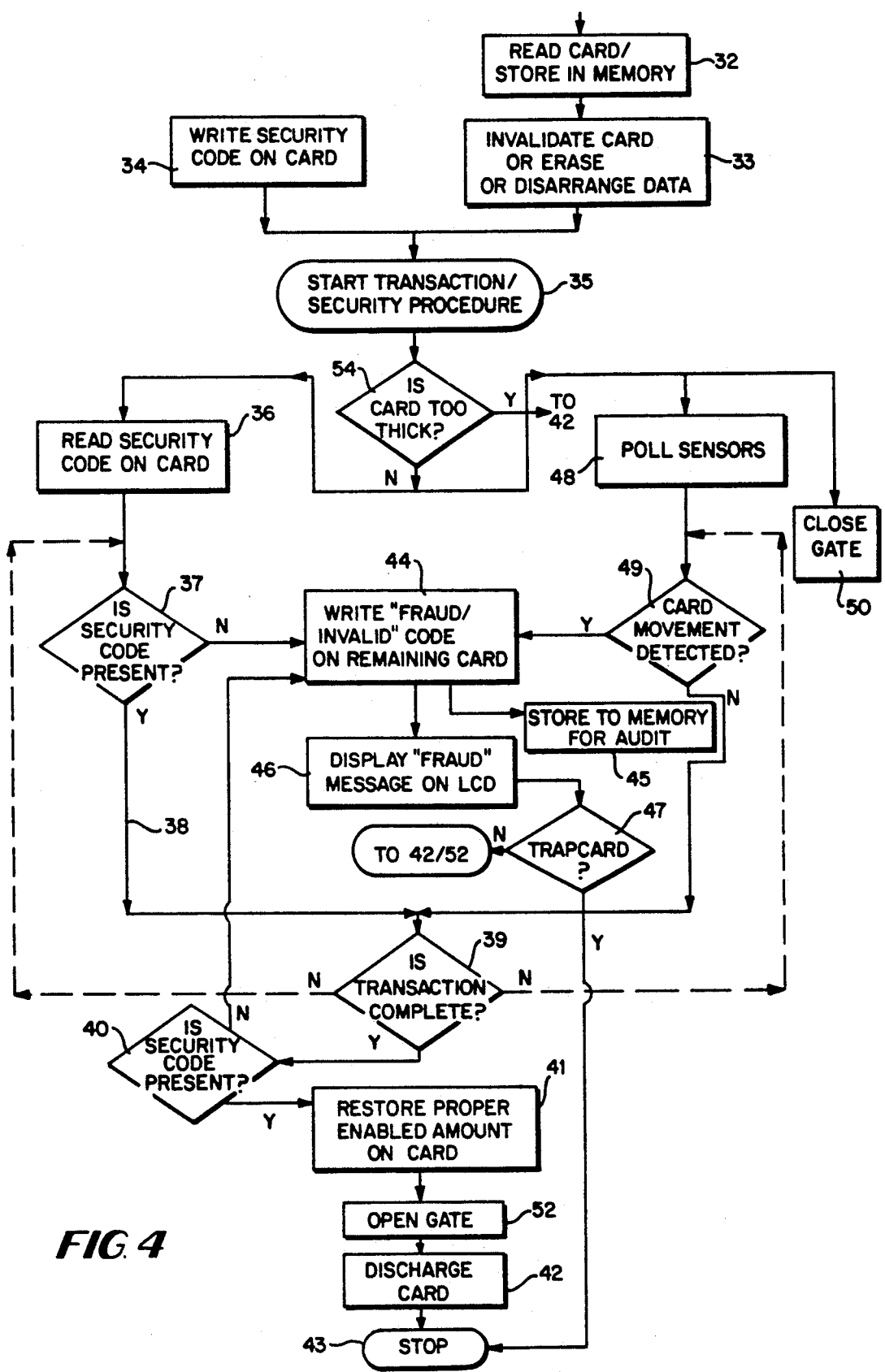
FIG. 4 is a high level flow chart showing implementation of the fraud preventing methods according to the invention.

According to the present invention, control of the components of FIG. 3 is changed in one or more ways in order to prevent the fraudulent transaction described with respect to FIGS. 1 and 2. A high level control schematic therefor is illustrated in FIG. 4.

The card 10 is read and the value thereof stored in memory as indicated by block 32, as is conventional. According to the present invention, the read/write head 18 may invalidate the card 10 at this stage (e.g. by writing information making it unusable, or erasing or disarranging data), as indicated at 33. Substantially simultaneously with the reading and memory storage of the card 10 in block 32, the read/write head 18 writes a security code on the card 10 in the magnetic strip 12 and/or 13 (see block 34). The security code can be any unique data that can be readily observed by the read/write head 18. After the functions in blocks 32-34 are accomplished, the transaction/security procedure is then started, as illustrated at 35.

According to one aspect of the present invention, the machine 17, after being available for transaction implementation after the start block 35, optionally first reads the security code on the card at block 36, with the read/write head 18. If the security code is present, as indicated at decision block 37, then by decision path 38 the procedure passes to decision block 39, which enables the transaction and then determines whether or not the transaction is complete. If the transaction is complete (as by the user pressing a button on the outside of the card reader 17), whether or not the security code has been read at 37, it is read at 40, and if present the CPU 22 controls the read/write head 18 to restore the proper enabled amount on the card 10—as illustrated by block 41—and revalidate the card if invalidated at 33. Then the card is discharged at 42, the procedure stopped at 43.

However, if the type of fraudulent manipulation described with respect to FIGS. 1 and 2 has been practiced (that is a worthless card substituted for a valuable one), at decision blocks 37 or 40 it will be determined that the security code is not present, in which case—as illustrated by block 44—a fraud/invalid code will be written on the magnetic area 12 and/or 13 of the remaining card (10') making it useless. At 44, further invalidation of the card need not take place if it was already invalidated at 33—rather 44 will merely prevent revalidation. Alternatively, additional invalidation can occur at 44, above and beyond what was provided at 33. Also, at 44 other data can be written on the remaining card 10, such as the date and place of the reader where the fraudulent transaction was attempted, for subsequent remedial or statistical use. This information may be stored, as indicated at 45. Also it is desirable to display some sort of a fraud message, such as illustrated at 46, by controlling the CPU 22 so that the LCD 27 writes "fraud" (see FIG. 3) or a like message. This may alert any authorized personnel in the area to apprehend the thief too. After the procedure of block 46, the procedure then proceeds to block 47.

At block 47, a decision is made about whether or not to trap the card. This may originally be programmed into the reader 17 when it is installed, or it may be enabled only if the same card is used twice in a short time period to attempt a fraudulent transaction. If a decision is made not to trap the card 10—as by closing gate 29, or locking gate 29 closed if already closed, and flashing a message on the LCD 27—then the procedure proceeds to block 43.

As a complimentary or alternative control system (if used as an alternative system the block 34 will not be utilized), the "poll sensors" control block 48 enabled. According to this control, the CPU 22 is controlled to poll at least one of the card location sensors 23 through 25 to determine whether it detects any card movement. For example if the normal card rest position is where the sensor 23 cannot detect the card position, the sensor 23 is polled to determined whether it has detected a card position, which would only be caused by unauthorized movement of the card from its normal rest position against the head 18. If in decision block 48 the sensor 23 has indicated that movement is detected, then the fraud abating block 44 is enabled, whereas if there is no card movement detected at decision block 48, then the normal transaction implementation path is followed as indicated at 49 and decision block 39.

As a third alternative or complimentary procedure/mechanism, the closed gate block 50 is enabled, which causes the CPU 22 to—once the card 10 has been moved into a position completely within the card reader 17, and associated with the magnetic head 18 (in the normal rest position)—operate the gate motor 30 to close the gate 29 (the dotted line position in FIG. 3). The gate 29 and gate motor 30 must be substantial enough that they cannot be easily defeated once closed since this is a security procedure. Once the gate 29 is closed, withdrawal of a card 10 from the device 17 is impossible until the transaction is terminated, so that the type of fraudulent manipulation as described with respect to FIGS. 1 and 2 is not possible. Once the transaction has been completed and the proper amount restored to the card at block 41, the open gate block 52 (see FIG. 4) is enabled, causing the CPU 22 to control the gate motor 30 to open the gate 29 (solid line position in FIG. 3).

Another optional way of preventing fraud by inserting two cards at once, or one and then another, is to measure the card thickness with appropriate probes (not shown) having linear cam face terminations. As illustrated at 54 in FIG. 4, thickness can be determined even before blocks 36, 48, 50, and the procedure can proceed only if the card is not too thick (excessive thickness indicating more than one card being present).

Because the invention relates primarily to changes in software for control of the CPU 22, it may be easily retrofit onto existing debit card readers 17, and may be effected in a simple and inexpensive manner.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of preventing fraud in a transaction with a magnetic debit card having magnetic media on a face thereof, and utilizing a debit card reader having a magnetic read/write head, comprising the steps of automatically:

(a) with the magnetic head, reading a card inserted into a debit card reader to determine information from the magnetic media thereon;
   (b) generally simultaneously with step (a), writing a securing code on the magnetic media with the magnetic head;
   (c) prior to completing a transaction with the card, reading the magnetic media to be sure that the security code is present; and
   (d) if in response to step (c) it is determined that the security code is not present, insuring that the card cannot be used for further transactions.

2. A method as recited in claim 1 wherein the debit card reader has an LCD, and comprising the further step (e) of automatically, if in response to step (c) it is determined that the security code is not present, displaying a fraud indicating message on the LCD.

3. A method as recited in claim 1 comprising the further step of immediately after step (a) invalidating the card with the read/write head; and wherein step (d) is practiced by not revalidating the card; and comprising the further step (e), if it is determined that the security code is on the card during step (c), of revalidating the card.

4. A method as recited in claim 2 comprising the further step (f) if in response to step (c) it is determined that the security code is not present, writing date, location, and/or other identifying data on the magnetic media of the card in the reader with the read/write head.

5. A method as recited in claim 1 wherein the debit card reader has a gate at the entrance to the reader, and comprising the further steps of: (e) generally simultaneously with step (a), closing the gate to positively prevent movement of the card out of the entrance to the reader until the transaction is completed; and (f) after completion or termination of a transaction, opening the gate to provide for removal of the card from the reader, or trapping the card if it is an illegal card.

6. A method as recited in claim 1 wherein the debit card reader has a plurality of card position sensors, and comprising the further step (e) of automatically, generally simultaneously with step (a), after the card has come to rest in a transaction position, enabling at least one of the sensors to sense the movement of the card from its rest position; and (f) if in response to step (e) it is determined that the card has moved more than a predetermined amount from its rest position prior to completion of a transaction, invalidating the card in the reader with the read/write head or precluding revalidation of the card by the read/write head.

7. A method as recited in claim 6 wherein the debit card reader has an LCD, and comprising the further step (e) of automatically, if in response to step (c) it is determined that the security code is not present, displaying a fraud indicating message on the LCD.

8. A method as recited in claim 5 wherein the debit card reader has a plurality of card position sensors, and comprising the further step (e) of automatically, generally simultaneously with step (a), after the card has come to rest in a transaction position, enabling at least one of the sensors to sense the movement of the card from its rest position; and (f) if in response to step (e) it is determined that the card has moved more than a predetermined amount from its rest position prior to completion of a transaction, invalidating the card in the reader with the read/write head, or precluding revalidation of the card.

9. A method as recited in claim 1 comprising the further step (e) of determining the thickness of card inserted into the card reader, and rejecting the card if it is too thick.

10. A method of preventing fraud in a transaction with a debit card having magnetic media on a face thereof, and utilizing a debit card reader having a magnetic read/write head, and a gate at the entrance to the reader, and wherein the debit card reader also has an LCD, comprising the steps of automatically:
(a) with the magnetic head, reading a card inserted into a debit card reader to determine information from the magnetic media thereon;
(b) generally simultaneously with step (a), closing the gate to positively prevent movement of the card out of the entrance to the reader until the transaction is completed;
(c) writing a security code of the card;
(d) after completion or termination of a transaction, opening the gate to provide for removal of the card from the reader, or trapping the card in the reader if it is determined to be an illegal card, without a security code, and
(e) automatically, if in response to step (d) it is determined that the security code is not present, displaying a fraud indicating message on the LCD.

11. A method of preventing fraud in a transaction with a debit card having magnetic media on a face thereof, and utilizing a debit card reader having a magnetic read/write head, and a plurality of card position sensors, comprising the steps of automatically:
(a) with the magnetic head, reading a card inserted into a debit card reader to determine information from the magnetic media thereon;
(b) generally simultaneously with step (a), after the card has come to rest in a transaction position, enabling at least one of the sensors to sense the movement of the card from its rest position;
(c) if in response to step (b) it is determined that the card has moved more than a predetermined amount from its rest position prior to completion of a transaction, invalidating the card in the reader with the read/write head, or precluding revalidation of the card; and
(d) if in response to step (c) it is determined that the card has moved, also writing data, location, and/or other identifying data on the magnetic media of the card in the reader with the read/write head.

12. Apparatus for preventing fraud in the utilization in a transaction of debit cards having magnetic media on a face thereof, comprising:
a debit card reader having a magnetic read/write head; and
means for automatically electronically controlling operation of said magnetic read/write head;
said means for controlling operation of said magnetic read/write head comprising means for writing a security code on the magnetic media of a card with the magnetic head generally simultaneously with reading of the card inserted into said debit card reader; means for reading the magnetic media, prior to completing a transaction with the card, to be sure that the security code is present; and means for invalidating the card in the reader with said read/write head, or precluding revalidation of the card, should it be determined that the security code is not present.

13. Apparatus as recited in claim 12 further comprising an LCD, and wherein said control means further comprises means for controlling said LCD to provide a fraudulent indicating message therewith if it is determined that the security code is not present when the magnetic media is read.

14. A method of preventing fraud in a transaction with a debit card having magnetic media on the face thereof, and utilizing a debit card reader having a magnetic read/write head and an LCD, and a plurality of card position sensors, comprising the steps of automatically:
(a) with the magnetic head, reading a card inserted into a debit card reader to determine information from the magnetic media thereon;
(b) generally simultaneously with step (a), after the card has come to rest in a transaction position, enabling at least one of the sensors to sense the movement of the card from its rest position;
(c) if in response to step (b) it is determined that the card has moved more than a predetermined amount from its rest position prior to completion of a transaction, invalidating the card in the reader with the read/write head, or precluding revalidation of the card; and
(d) if in response to step (c) it is determined that the card has moved more than a predetermined amount from its rest position prior to completion of a transaction, displaying a fraud indicating message on the LCD.

* * * * *